United States Patent [19]

Gibson et al.

[11] Patent Number: 5,716,183
[45] Date of Patent: Feb. 10, 1998

[54] HAND TRUCK

[76] Inventors: Joseph A. Gibson; James E. McNamara, both of c/o MDG Outdoor Wear, Rear 855 Sherman Ave., Springfield, Ohio 45503

[21] Appl. No.: 422,353

[22] Filed: Apr. 14, 1995

[51] Int. Cl.$^6$ .................................................. B62B 1/06
[52] U.S. Cl. .................... 414/451; 280/47.28; 414/456; 414/490
[58] Field of Search .................... 280/47.24, 47.27, 280/47.28, 47.29; 414/420, 427, 450, 451, 453, 454, 455, 456, 490, 607, 621, 622

[56] References Cited

U.S. PATENT DOCUMENTS

| 963,410 | 7/1910 | Welshans | 280/47.24 |
|---|---|---|---|
| 1,193,729 | 8/1916 | Stebler . | |
| 1,553,963 | 9/1925 | Swartsel | 414/452 |
| 2,196,822 | 4/1940 | Bissell | 414/456 |
| 2,516,260 | 7/1950 | Schildmeier | 280/47.28 |
| 2,583,216 | 1/1952 | Hoffman | 414/427 |
| 2,640,604 | 6/1953 | Curley | 414/427 |
| 2,795,433 | 6/1957 | Moriarty | 280/47.28 |
| 2,808,163 | 10/1957 | Petzke, II et al. | 214/383 |
| 2,903,147 | 9/1959 | Davis, Jr. | 214/512 |
| 3,089,602 | 5/1963 | Hunziker | 414/621 |
| 3,182,835 | 5/1965 | Meyer et al. | 414/456 |
| 3,262,590 | 7/1966 | Lynn | 214/394 |
| 3,391,905 | 7/1968 | Burns | 254/7 |
| 3,690,488 | 9/1972 | Cave | 414/456 |
| 3,838,779 | 10/1974 | Dawson | 414/456 |
| 3,868,033 | 2/1975 | Le Duff | 414/420 |
| 3,951,287 | 4/1976 | Cofer | 414/427 |
| 4,123,038 | 10/1978 | Meyers | 414/427 |
| 4,722,511 | 2/1988 | Chitwood | 254/7 |
| 4,793,623 | 12/1988 | Talbot | 280/47.24 |
| 4,856,959 | 8/1989 | Tabayashi | 414/451 |
| 4,981,412 | 1/1991 | Hawkins | 414/454 |
| 5,120,183 | 6/1992 | Phillips | 414/490 |
| 5,123,666 | 6/1992 | Moore | 280/47.28 |
| 5,373,593 | 12/1994 | Decky et al. | 414/460 |

FOREIGN PATENT DOCUMENTS

| 1296523 | 11/1972 | United Kingdom | 414/622 |
|---|---|---|---|

*Primary Examiner*—Thomas J. Brahan
*Attorney, Agent, or Firm*—Biebel & French

[57] ABSTRACT

A hand truck for moving objects from one location to another is disclosed as including a frame extending longitudinally from a foot end to a handle end, the frame including a first elongated member, a second elongated member spaced from the first elongated member, and a cross member extending between and fixed to the first and second elongated members. The hand truck also includes at least one ground engaging wheel rotatably mounted to the frame for rotation about a wheel axis adjacent the foot end thereof. A first arm slidingly connected to the first elongated member, wherein the first arm extends substantially perpendicular to the first elongated member, and a second arm slidingly connected to the second elongated member, wherein the second arm extends substantially perpendicular to the second elongated member are provided, as is a brace member slidingly connected to the frame. The first arm, the second arm, and the brace member are fixed at desired locations along the frame between the foot end and the head end. The first and second arms include a cross member extending between and connected thereto to position the first and second arms in substantially parallel relation.

7 Claims, 3 Drawing Sheets

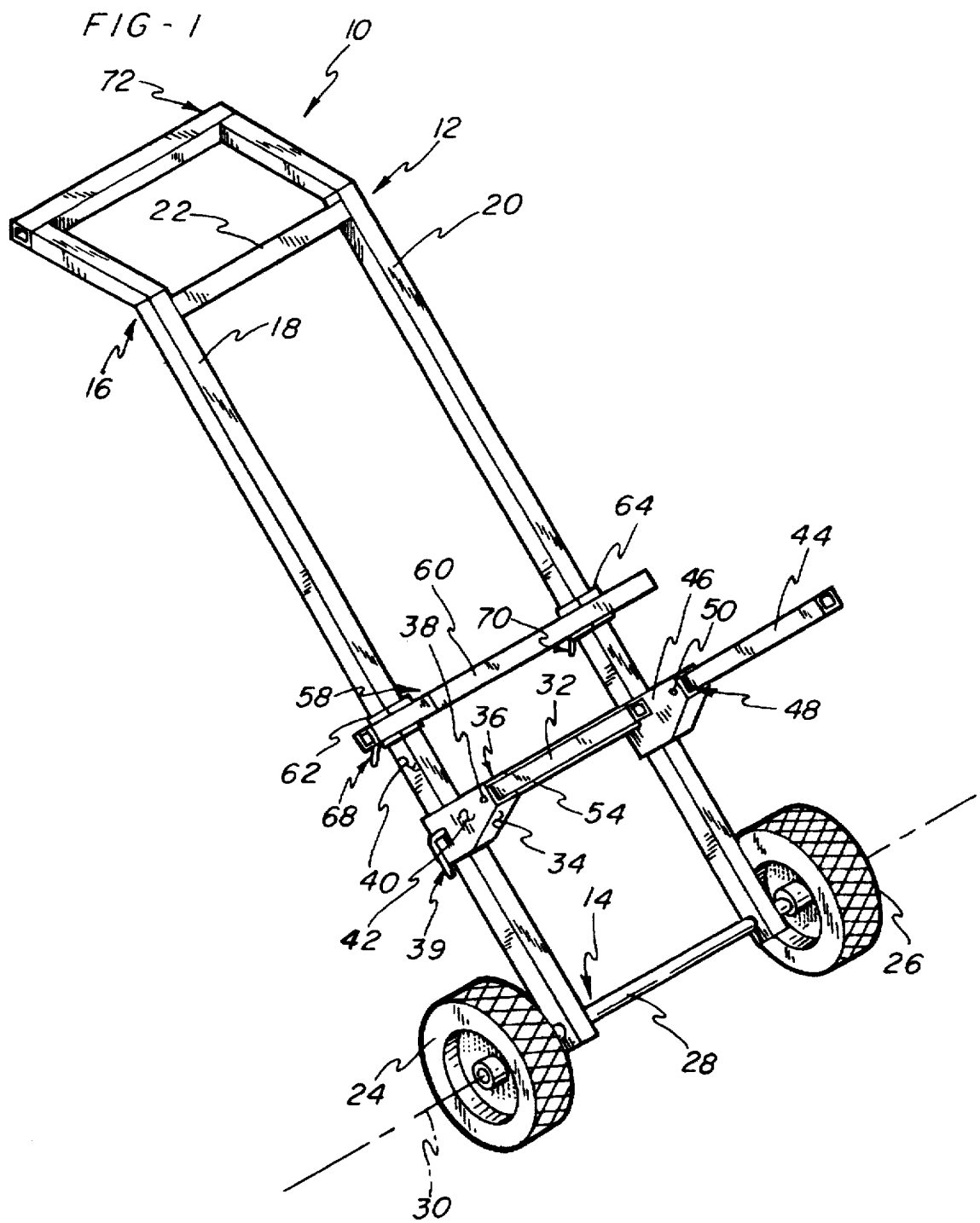

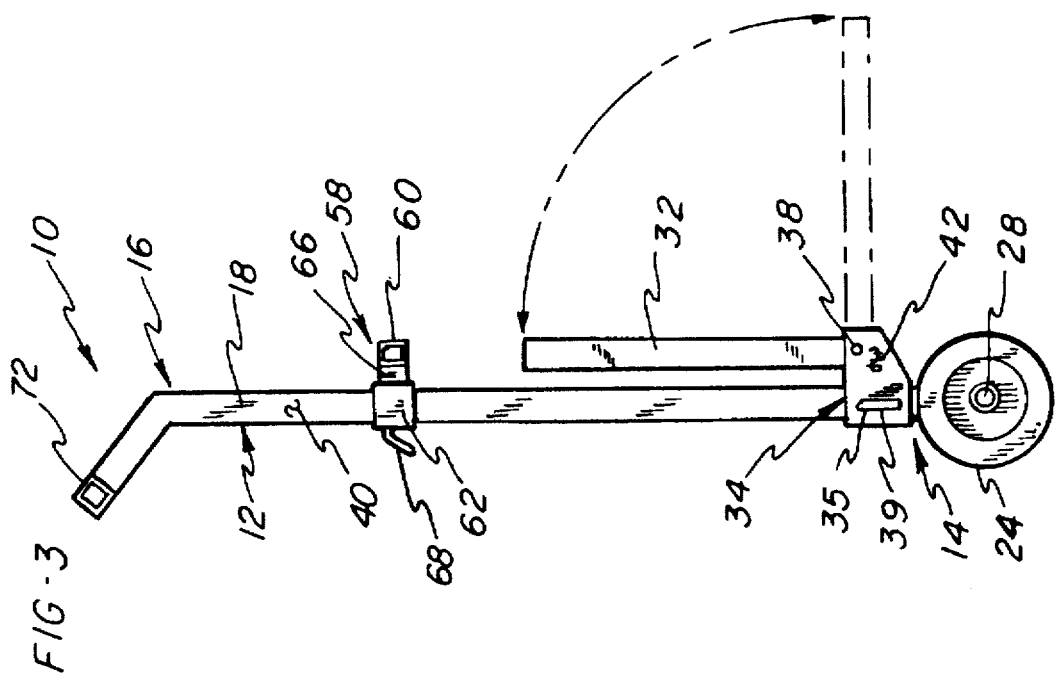
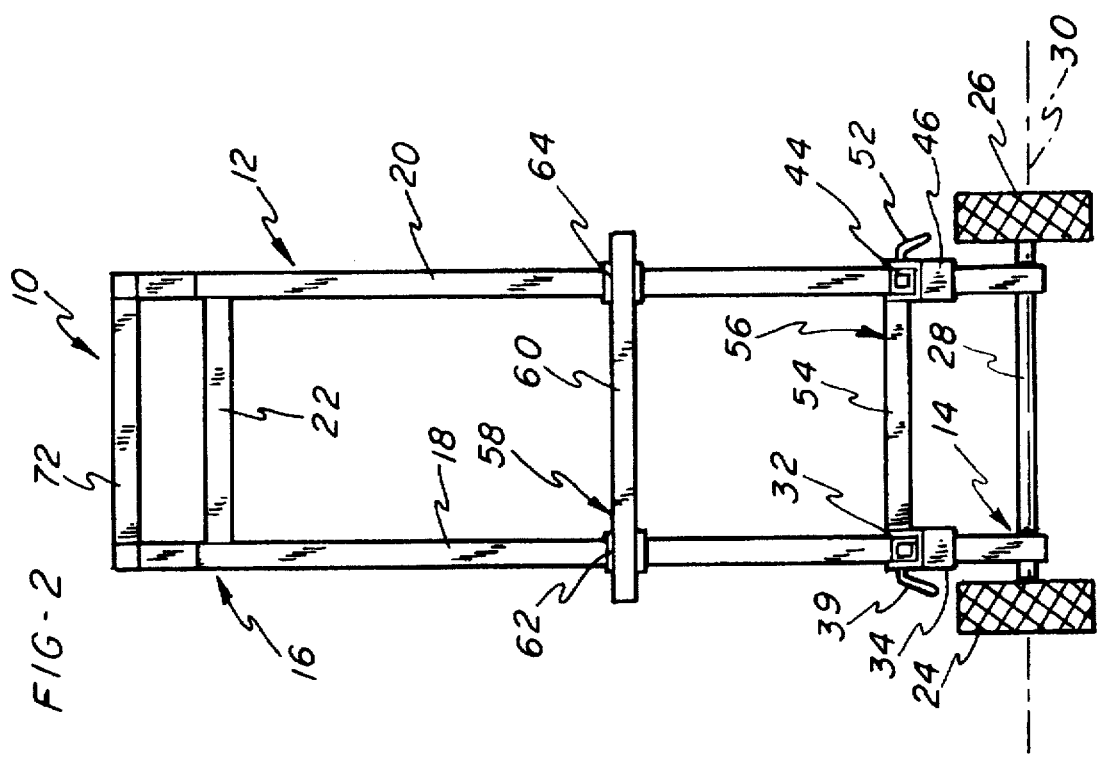

HAND TRUCK

BACKGROUND OF THE INVENTION

1. Field of the Invention

The present invention relates to a hand truck for moving objects from one location to another and, more particularly, to a hand truck having a pair of members slidingly connected to a frame which are able to retain an object therebetween.

2. Description of Related Art

Devices for handling and transporting various items are known in the prior art and include dolly-style hand trucks or carts such as shown in U.S. Pat. No. 1,193,729 to Stebler, U.S. Pat. No. 2,795,433 to Moriarity, and U.S. Pat. No. 4,793,623 to Talbot. It will be noted that the first two of these patents include a pair of arms which are able to clamp or grip an object horizontally therebetween. The Talbot patent involves a hand truck which includes locking arms used to clamp an object between the arms and a bottom supporting platform. Further, other patents disclosing a dolly-style hand truck utilized for specific purposes include U.S. Pat. No. 2,808,163 for desks and U.S. Pat. No. 2,903,147 for outboard motors. It will be noted, however, that in each of these patents the hand trucks disclosed therein involve a bottom support platform to engage a bottom surface of an object in conjunction with a pair of arms or the like to retain the object therebetween, if at all. Accordingly, none of these devices account for the need to retain an object between an upper surface and a middle area.

In particular, the transportation and placement of toilet bowls and other plumbing fixtures is difficult due to their heavy and cumbersome characteristics. Several devices have been developed for lifting toilet bowls and the like, such as those disclosed in U.S. Pat. No. 3,262,590 to Lynn, U.S. Pat. No. 3,391,905 to Burns, and U.S. Pat. No. 4,722,511 to Chitwood. Such devices are useful for lifting and setting toilet bowls with the particular goal of eliminating certain manual lifting. Nevertheless, these devices generally involve jacks or other complex lifting equipment and oftentimes are not easily maneuvered or stored.

Accordingly, it would be desirable for a device to be developed which is able to easily handle and transport an object which is not accessible to a bottom support platform, such as a toilet bowl or other plumbing fixture. It would also be desirable if such a device was adjustable in order that objects having a variety of shapes and sizes could be accommodated.

It is an object of the present invention to provide a device having the ability to lift and move objects without use of a bottom support platform.

It is another object of the present invention to provide a device which is able to retain an object vertically between two adjustable members located on the device.

Still another object of the present invention is to provide a device for lifting and transporting cumbersome objects which is simple, economical, compact, and mobile.

Yet another object of the present invention is to provide a device for lifting and transporting a toilet bowl or other plumbing fixture.

These objectives and other features of the present invention will become more readily apparent upon reference to the following description when taken in conjunction with the following drawing.

SUMMARY OF THE INVENTION

In accordance with one aspect of the present invention, a hand truck for moving objects from one location to another is disclosed as including a frame extending longitudinally from a foot end to a handle end, the frame including a first elongated member, a second elongated member spaced from the first elongated member, and a cross member extending between and fixed to the first and second elongated members. The hand truck also includes at least one ground engaging wheel rotatably mounted to the frame for rotation about a wheel axis adjacent the foot end thereof. A first arm slidingly connected to the first elongated member, wherein the first arm extends substantially perpendicular to the first elongated member, and a second arm slidingly connected to the second elongated member, wherein the second arm extends substantially perpendicular to the second elongated member are provided, as is a brace member slidingly connected to the frame. The first arm, the second arm, and the brace member are fixed at desired locations along the frame between the foot end and the head end. The first and second arms include a cross member extending between and connected thereto to align the first and second arms in substantially parallel relation.

In accordance with a second aspect of the present invention, a hand truck for moving an object from one location to another is disclosed as including a frame extending longitudinally from a foot end to a handle end, with the frame including a first elongated member, a second elongated member spaced from the first member, and a cross member extending between and fixed to the first elongated members. At least one ground engaging wheel rotatably mounted to the frame for rotation about a wheel axis adjacent the foot end thereof is provided so as to allow movement of the hand truck. Moreover, a first U-shaped member is slidingly connected to the frame at its closed end, wherein the first U-shaped member extends substantially perpendicular to the frame, and a second U-shaped member is slidingly connected to the frame at its open end, wherein the second U-shaped member extends substantially perpendicular to the frame, so that an object is retainable between the first and second U-shaped members.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

FIG. 1 is a perspective view of the hand truck of the present invention;

FIG. 2 is a front view of the hand truck depicted in FIG. 1;

FIG. 3 is a side view of the hand truck depicted in FIGS. 1 and 2, where the arms thereof are depicted as being pivotable.

DETAILED DESCRIPTION OF THE INVENTION

Figure 4:
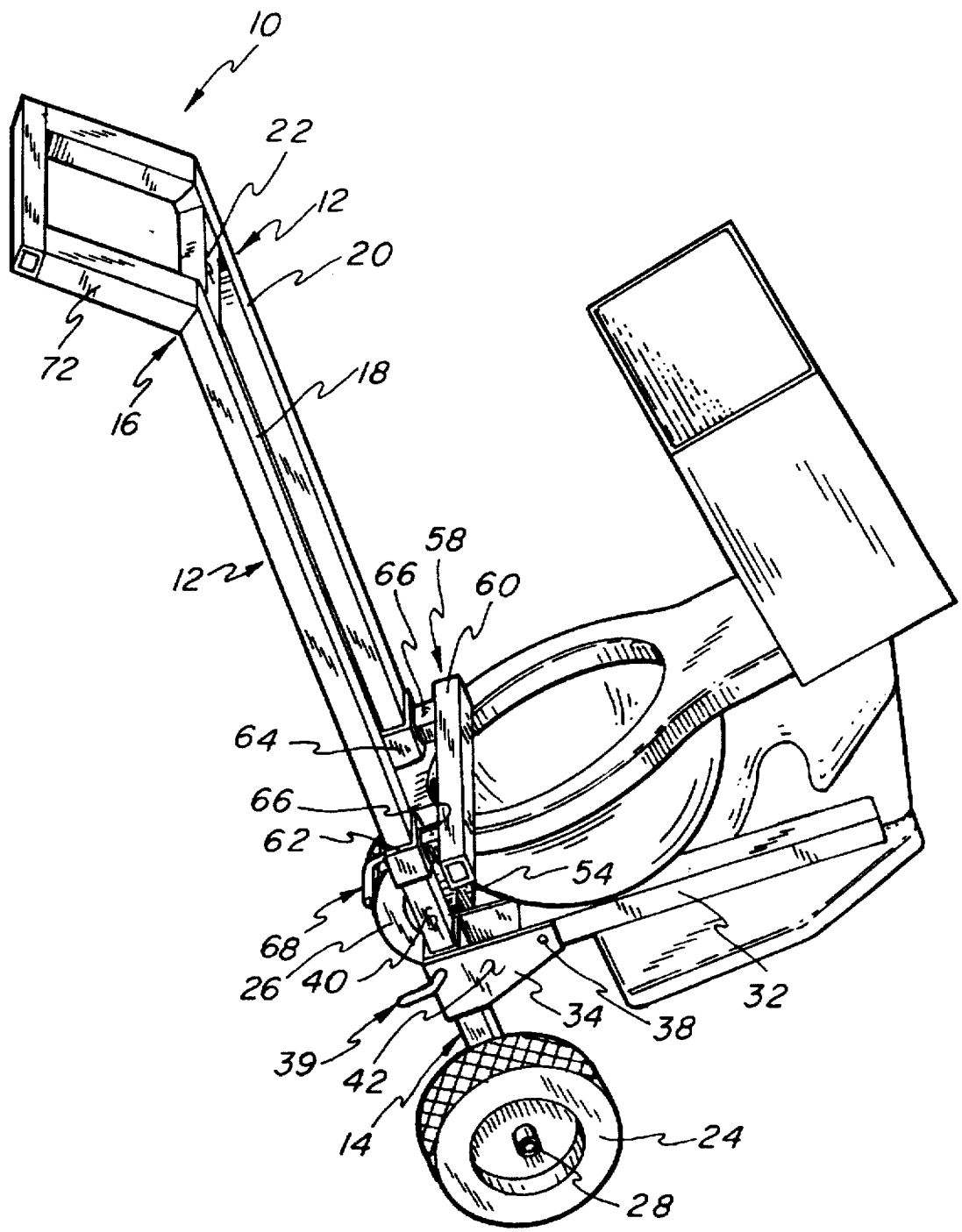
FIG. 4 is a longitudinal side view of the hand truck depicted in FIGS. 1–3, with a toilet bowl being retained thereby for movement.

Referring now to the drawings in detail, wherein identical numerals indicate the same elements throughout the figures, FIG. 1 depicts a hand truck 10 utilized for moving objects from one location to another. As seen therein, hand truck 10 generally has a dolly-type design with a frame 12. Frame 12 extends longitudinally from a foot end 14 to a handle end 16, and includes a first elongated member 18, a second elongated member 20 spaced from first elongated member 18, and a cross member 22 extending between and fixed to first and second elongated members 18 and 20, respectively.

It will also be seen from the figures that hand truck 10 preferably includes a pair of wheels 24 and 26 which are rotatably mounted to frame 12 by means of axle 28 extending between first elongated member 18 and second elongated member 20 at foot end 14 of frame 12. Accordingly, wheels 24 and 26 will rotate about a wheel axis 30 extending through axle 28.

A first arm 32 is slidingly connected to first elongated member 18 by means of a first mounting 34. It will be understood that frame 12 and its components, as well as first arm 32, are preferably made of metal tubing so that first mounting 34 is able to receive first arm 32 at an opening 36 and is slidingly engaged to first elongated arm 18 by a sleeve-like portion 35 fitted around first elongated member 18. It will be seen that first arm 32 is retained to first mounting 34 by means of a pin 38 or other similar device which preferably allows first arm 32 to pivot therearound adjacent to first elongated arm 18. In order to position first arm 32 along first elongated arm 18 in a desired position or height (since hand truck 10 generally has a vertical orientation), a clamp 39 may be utilized to tighten first mounting 34 to first elongated arm 18. Alternatively, first elongated arm 18 may include a plurality of holes formed along a side surface 40, so that a pin may be inserted through a hole formed in surface 42 of first mounting 34 and into such hole as desired.

Likewise, a second arm 44 is slidingly connected to second elongated arm 20 in the same fashion, wherein second arm 44 extends substantially perpendicular thereto. Therefore, it will be seen that a second mounting 46 is provided which also includes an opening 48 for receiving second arm 44 therein. Second mounting 46 also includes a sleeve-like portion 45 which is slidingly engaged to second elongated arm 20. A pin 50 or other similar device may be utilized to retain second arm 44 within opening 48, which also preferably allows second arm 44 to pivot therearound adjacent to second elongated arm 20. Also, a clamp 52 may be utilized to hold second mounting 46 (and the second arm 44) in position along second elongated arm 20. Otherwise, as described hereinabove, a series of holes may be provided within a side surface of second elongated arm 20 with a corresponding hole through a side surface of second mounting 46 so that a pin may be inserted therethrough and aligned with a hole in second elongated arm 20 at the appropriate height.

Although first and second arms 32 and 44 may be positioned individually along first and second elongated arms 18 and 20, respectively, it is preferred that a cross member 54 extend between and be connected to both first mounting 34 and second mounting 46 so that first and second arms 32 and 44 are required to be aligned at substantially the same position between foot end 14 and handle end 16 on frame 12. It will be understood that this embodiment then comprises a U-shaped member 56 made up of first arm 32, second arm 44, and cross member 54, where U-shaped member 56 is slidingly connected to frame 12 at its closed end.

It will be seen from the figures that first and second arms 32 and 44 are linear in shape, although one or both may be non-linear for a given object to be transported. Accordingly, it is preferred that first and second arms 32 and 44, respectively, be fixed to first mounting 34 and second mounting 46 so that replacement arms having different configurations may be utilized. Further, as noted above, it is preferred that first and second arms 32 and 34 be pivotable about pins 38 and 50, whether cross member 54 is provided or not, so that hand truck 10 may be made more compact when being stored or otherwise not in use. Also, while not shown, it is contemplated by the present invention that first and second arms 32 and 44 may be of the type which can be adjustable lengthwise, such as through telescoping or other means.

Hand truck 10 also includes a brace member 58 which is slidingly connected to frame 12. Although brace member 58 is preferably located between first and second arms 32 and 44 and handle end 16 of frame 12 as shown in the figures, it is possible for brace member 58 and first and second arms 32 and 44 to be rearranged in opposite position by removing axle 28 and slipping them off the foot end 14 of frame 12. It will be seen from FIGS. 1–3 that brace member 58 has a member 60 oriented transversely to first and second elongated members 18 and 20, respectively. It will be noted from FIG. 3 that member 60 is positioned forward of frame 12 (same side in which first and second arms 72 and 44 extend) so that it is able to engage an upper surface or end of an object in a locking engagement with first and second arms 32 and 44.

Brace member 58 also includes a pair of collars 62 and 64 which are slidingly engaged with first and second elongated members 18 and 20, respectively. Brace member 58 includes a pair of substantially parallel intermediate portions 66 (as best seen with respect to collar 62 in FIG. 3) between collars 62 and 64 and transverse member 60 at each end thereof. Accordingly, it will be understood that brace member 58 also has a substantially U-shaped configuration which is slidingly connected to frame 12 at its open end. Of course, the intermediate portions 66 are generally not as long as first and second arms 32 and 44.

Although not shown in the figures, it is contemplated by the present invention that brace member 58 may have transverse member 60 be of a variety of lengths, so long as it minimally extends between first and second elongated arms 18 and 20. Also, intermediate portions 66 of brace member 58 may preferably be extendable so that the space between transverse member 60 and frame 12 is adjusted for a given application. It will also be noted that a clamp means 68 and 70 are provided in order to retain collars 62 and 64 to frame 12 at a desired position along first and second elongated arms 32 and 44. In this way, brace member 58 is able to be spaced the appropriate distance from first and second arms 32 and 44 so as to retain an object therebetween.

It will also be seen with respect to frame 12 that a handle 72 may be provided for moving and manipulating hand truck 10, where handle 72 is connected to both first elongated member 18 and second elongated member 20 at the handle end 16 of frame 12. Preferably, handle 72 is oriented at an angle to frame 12 to allow easier use by an operator.

Due to the configuration of hand truck 10, a toilet bowl (see FIG. 4) or other similar plumbing fixture may be retained between brace member 58 and first and second arms 32 and 44. Because a toilet fixture is not easily accessed at its lower surface by a bottom support platform or the like found on other prior art dolly-style hand trucks, first and second arms 32 and 44 are able to engage the toilet bowl at a mid portion with brace member 58 being positioned along a top surface of the rim thereof. Accordingly, when positioned in locking engagement with hand truck 10, the toilet bowl may be removed, transported, or set easily with a minimum of manual labor. Moreover, it will be noted that hand truck 10 is configured so as to retain a toilet bowl from either the front or from the rear.

Having shown and described the preferred embodiment of the present invention, further adaptations of the hand truck can be accomplished by appropriate modifications by one of ordinary skill in the art without departing from the scope of the invention.

What is claimed is:

1. A hand truck for moving a toilet bowl from one location to another, said band truck comprising:
   (a) a frame extending longitudinally from a foot end to a handle end, said flame including a first elongated member, a second elongated member spaced from said first member, and a cross member extending between and fixed to said first and second elongated members;
   (b) at least one ground engaging wheel rotatably mounted to said frame for rotation about a wheel axis adjacent the foot end thereof, said frame mounted for pivotal movement about said wheel axis;
   (c) a first U-shaped member having a closed end slidingly connected to said frame for movement longitudinally along said frame, wherein said first U-shaped member includes a pair of substantially parallel first and second arms extending substantially perpendicular to said frame in a forward direction for butting engagement with a mid portion of an outside surface of said toilet bowl;
   (d) a second U-shaped member having an open end slidingly connected to said frame for movement longitudinally along said frame, wherein said second U-shaped member includes a pair of substantially parallel first and second arms extending substantially perpendicular to said frame in said forward direction for butting engagement with a top surface of the rim or said toilet bowl;
   (e) means for fixing said first U-shaped member in position along said frame; and
   (f) means for fixing said second U-shaped member in position along said frame;
wherein said toilet bowl is lockingly engagable between said first and second U-shaped members.

2. The hand truck of claim 1, wherein at least one of said first and second U-shaped members is pivotable about a pair of points adjacent said frame.

3. The hand truck of claim 1 wherein said first and second arms of said first U-shaped member are greater in length than said first and second arms of said second U-shaped member.

4. A hand truck for moving a toilet bowl from one location to another, said hand truck comprising:
   (a) a frame extending longitudinally from a foot end to a handle end, said frame including a first elongated member, a second elongated member spaced from said first elongated member, and a cross member extending between and fixed to said first and second elongated members;
   (b) at least one ground engaging wheel rotatably mounted to said frame for rotation about a wheel axis adjacent said foot end thereof, said frame mounted for pivotal movement about said wheel axis;
   (c) a first arm slidingly connected to said first elongated member for movement longitudinally along said first elongated member, wherein said first arm comprises an elongated projection extending substantially perpendicular to said first elongated member in a forward direction for buffing engagement with a mid portion of an outside surface of said toilet bowl;
   (d) a second arm slidingly connected to said second elongated member for movement longitudinally along said second elongated member, wherein said second arm comprises an elongated projection extending substantially perpendicular to said second elongated member in said forward direction for butting engagement with a mid portion of an outside surface of said toilet bowl;
   (e) a brace member extending between and slidingly connected to said first and second elongated members, said brace member including a pair of substantially parallel elongated arms extending in said forward direction for placing said brace member brining engagement with a top surface of the rim of said toilet bowl;
   (f) means for fixing said first arm in position along said first elongated member;
   (g) means for fixing said second arm in position along said second elongated member; and
   (h) means for fixing said brace member in position along said lust and second elongated members;
wherein said toilet bowl is lockingly engagable between said first and second arms and said brace member.

5. The hand truck of claim 4 wherein said means for fixing said first and second arms comprises first and second arm clamps frictionally contacting said first and second elongated members, respectively.

6. The hand truck of claim 4 wherein said means for fixing said brace member comprises first and second brace clamps frictionally contacting said first and second elongated members, respectively.

7. A hand truck for moving a toilet bowl from one location to another, said hand truck comprising:
   (a) a frame extending longitudinally from a foot end to a handle end, said frame including a first elongated member, a second elongated member spaced from said first member, and a cross member extending between and fixed to said first and second elongated members;
   (b) at least one ground engaging wheel rotatably mounted to said frame for rotation about a wheel axis adjacent the foot end thereof, said frame mounted for pivotal movement about said wheel axis;
   (c) a first U-shaped member having a closed end slidingly connected to said frame for movement longitudinally along said frame, wherein said first U-shaped member includes a pair of substantially parallel first and second arms extending substantially perpendicular to said frame in a forward direction for butting engagement with a mid portion of an outside surface of said toilet bowl;
   (d) a second U-shaped member having an open end slidingly connected to said frame for movement longitudinally along said frame, wherein said second U-shaped member includes a pair of substantially parallel first and second arms extending substantially perpendicular to said frame in said forward direction for butting engagement with a top surface of the rim of the toilet bowl, said first and second arms of said first U-shaped member having a length greater than said first and second arms of said second U-shaped member,
   (e) means for fixing said first U-shaped member in position along said frame; and
   (f) means for fixing said second U-shaped member in position along said frame;
wherein said toilet bowl is lockingly engagable between said first and second U-shaped members.

* * * * *

UNITED STATES PATENT AND TRADEMARK OFFICE
CERTIFICATE OF CORRECTION

PATENT NO. : 5,716,183
DATED : February 10, 1998
INVENTOR(S) : Joseph A. Gibson; James E. McNamara It is certified that error appears in the above-indentified patent and that said Letters Patent is hereby corrected as shown below:

Claim 1, line 2 replace "band" with --hand--.

Claim 1, line 4 replace "flame" with --frame--.

Claim 4, column 6, line 13 replace "brining" with --in butting--.

Claim 4, column 6, line 16 insert --(f)-- before "means".

Claim 4, column 6, line 21, replace "lust" with --first--.

Signed and Sealed this

Twenty-eighth Day of April, 1998

Attest:

BRUCE LEHMAN

Attesting Officer

Commissioner of Patents and Trademarks